Oct. 4, 1932.   E. M. PFAUSER   1,881,029
SOCKET WRENCH
Filed May 29, 1930

Inventor
Edward M. Pfauser
By
Attorneys

Patented Oct. 4, 1932

1,881,029

UNITED STATES PATENT OFFICE

EDWARD M. PFAUSER, OF MILWAUKEE, WISCONSIN, ASSIGNOR TO BLACKHAWK MANUFACTURING COMPANY, OF MILWAUKEE, WISCONSIN

SOCKET WRENCH

Application filed May 29, 1930. Serial No. 456,966.

This invention relates to new and useful improvements in socket wrenches and more particularly to a socket wrench which is especially adapted for use in removing automobile tire rims.

One of the objects of my invention is the provision of a socket wrench which is adapted not only for use in removing the nuts from the securing bolts for automobile tire rims but can be used equally as well for detaching the clamping member which holds the end of the rim section together so that both features can be incorporated in the construction of a single tool.

Another object of the invention is the provision of a socket wrench of the above type wherein the socket portion is provided with a transverse bore adapted to receive the reduced end portion of a lever clamp on a tire rim whereby to actuate the lever clamp and disconnect the abutting end sections of a tire rim, and the handle portion of the tool is so arranged as to provide for the proper leverage in operating upon this member.

A further object of the invention is the provision of a socket wrench including a substantially longitudinal body having a socket end with the central bore extending inwardly from the socket end and provided with a transverse bore communicating with the central bore, the socket being provided with an operating handle disposed at right angles thereto whereby the proper leverage may be obtained for actuating the nuts and other devices.

With the above and other objects in view, the invention consists in the novel features of construction, the combination and arrangement of parts hereinafter more fully set forth, pointed out in the claim and shown in the accompanying drawing wherein:

Figure 1:
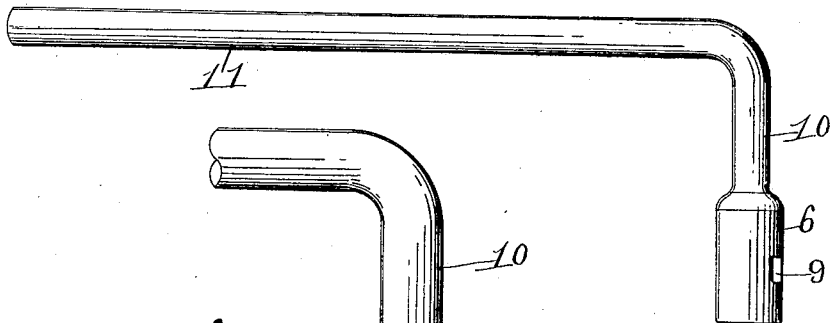
Figure 1 is a side elevation of a tool constructed in accordance with my invention.
Figure 2:
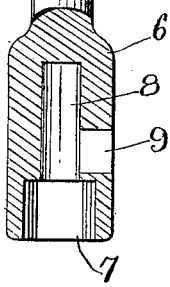
Figure 2 is a similar view somewhat enlarged with parts thereof broken away and illustrated in cross section.

The usual construction of automobile tire rims which support the pneumatic tire at the present time, is to provide a split ring which has upon opposite sides of the split portion spaced ears 1 and spaced ears 2 with a clamping lever 3 pivoted to the spaced ears 2 and adapted to be forced between the ears 2 with a locking pin 4, maintaining the lever in a clamped position. The outer end of this clamping lever is usually provided with a reduced section 5 and in order to release the ends of the rim, it is necessary to engage the reduced section 5 with a tool, after the pin 4 has been removed to move this clamping lever upon its pivot.

It is, therefore, one of the principal objects of my invention to utilize a tool which can be efficiently used for removing the nuts on the bolts which fasten the rim to the wheel and at the same time provide means whereby to engage the reduced portion 5 of the clamping lever so that the clamping lever can be quickly disengaged.

Referring now more particularly to the main construction of my improved tool, it will be noted that I provide a body portion 6 substantially cylindrical upon its exterior and provided at its outer end with a socket portion 7 which is used for engaging the nuts which hold the tire rim to the wheel so that these nuts can be quickly removed. In addition to the socket 7, the body 6 is provided with a longitudinal bore 8, the axis of which is in substantial alignment with the axis of the socket 7, and arranged at right angles to the bore 8 adjacent the inner end of the socket portion 7 is a transverse opening 9 which is adapted to receive therethrough the reduced portion 5 on the clamping lever 3, as illustrated in Figure 4 whereby to disengage this clamping lever.

Extending longitudinally of the body 6 is a shank portion 10, the major portion of which is disposed at right angles to form a hand lever 11.

It will be apparent from this construction that with this tool, the socket portion 7 can be readily used for removing the ordinary nuts on the bolts which hold the rim to the wheel and after the bolts have been removed, the tool can be readily used for engagement with the clamping lever 3 to remove this lever, so that the rim can be quickly removed from the wheel.

Figure 4:
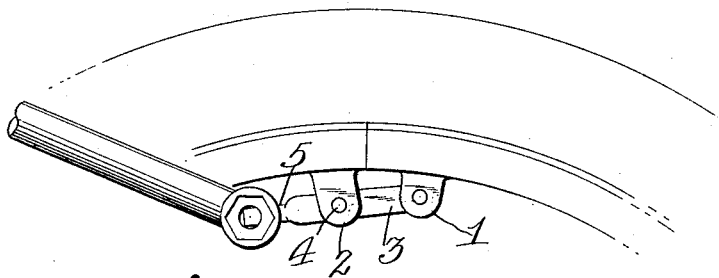

It will be noted that in applying the body 6 to the reduced portion 5, the inner end of the reduced portion extends into the longitudinal bore 8, as shown in Figure 4, so that the hand lever 11 is disposed at an angle with respect to the body 6, thus providing for the proper leverage so that the clamping lever 3 can be readily forced downwardly from between the perforated ears 2.

Figure 3:
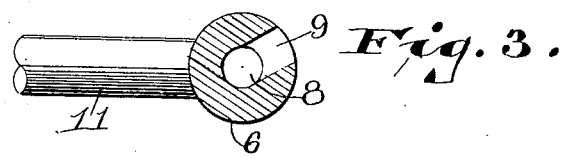
Figure 3 is a transverse section taken through the socket portion of the tool; and, Figure 4 is an end elevation illustrating the application of the tool to the lever clamp of a tire rim.

From the showing in Figure 3, it will be noted that the relative position of the opening 9 is substantially at an angle with respect to the relative position of the hand lever 11, so that when the device is applied to the reduced end of the clamping lever 3, the handle portion 11 will be positioned to assure considerable leverage thereon for removing the clamping member 3. The above is a very important feature in view of the fact that the only tool known on the market at the present time does not give the proper leverage for quickly removing this clamping lever 3, and it is therefore one of applicant's main objects to provide means for easily removing this clamping lever.

In view of the fact that the tool is of an extremely simple nature, it is believed that the same can be manufactured and placed on the market at a very low cost and will be an efficient tool for the purpose described above.

While I have shown and described the preferred embodiment of my invention, it will be apparent that slight changes may be made in the construction when putting the invention into practice without departing from the spirit of the same or the scope of the appended claim.

I claim:

A tool comprising a shank having an enlargement at one end provided with a longitudinal bore having a reduced inner portion and a transverse opening communicating with the reduced portion of the bore intermediate the ends thereof and of a greater size than the diameter of said reduced portion and of a less size than the diameter of the other portion of the bore, the major portion of the shank extending at right angles to the enlargement forming a manipulating crank handle.

In testimony that I claim the foregoing I have hereunto set my hand at Milwaukee, in the county of Milwaukee and State of Wisconsin.

EDWARD M. PFAUSER.